United States Patent [19]

Walker et al.

[11] 3,953,337
[45] Apr. 27, 1976

[54] METHOD OF DRILLING WELLS EMPLOYING WATER BASE DRILLING FLUIDS

[75] Inventors: Clarence O. Walker, Richmond; Thad O. Walker, Houston; Jack H. Douglass, Bellaire, all of Tex.

[73] Assignee: Texaco Inc., New York, N.Y.

[22] Filed: Nov. 16, 1973

[21] Appl. No.: 416,701

[52] U.S. Cl. .................... 252/8.5 A; 175/65; 252/8.5 C
[51] Int. Cl.² ........................................ C09K 7/02
[58] Field of Search .............. 252/8.5 A, 8.5 C; 175/65

[56] References Cited
UNITED STATES PATENTS

| 2,589,949 | 12/1949 | Meadors | 252/8.5 |
| 2,786,027 | 3/1957 | Salathiel | 252/8.5 |

OTHER PUBLICATIONS

Rogers, Composition and Properties of Oil Well Drilling Fluids, Second Edition, Pub. 1953, pp. 310 and 334–338.

Primary Examiner—Herbert B. Guynn
Attorney, Agent, or Firm—T. H. Whaley; C. G. Ries; James F. Young

[57] ABSTRACT

Method of and composition for the treatment of an aqueous drilling fluid containing contaminating amounts of salt whereby the rheological properties of the aqueous fluid are improved by treatment with a polyethylene glycol in the molecular weight range of from about 200 to 500.

2 Claims, No Drawings

METHOD OF DRILLING WELLS EMPLOYING WATER BASE DRILLING FLUIDS

The present invention relates to a method of and composition for the treatment of an aqueous drilling fluid. More particularly, the present invention is directed to a method of and composition for restoring the rheological properties of a fresh water drilling fluid that has become contaminated with salt using a prescribed amount of polyethylene glycol, hereinafter more fully defined.

It is known from U.S. Pat. No. 2,589,949 that the viscosity of an aqueous drilling fluid containing clay can be reduced using as the viscosity control agent a polyethylene glycol having a molecular weight of from 150–8000 in an amount of from about 0.1 to about 10% by weight, based on the drilling fluid weight.

From U.S. Pat. No. 2,786,027 it is known to use from 0.5 to 5 pounds of a polyethylene glycol or a polypropylene glycol, of a molecular weight range of between about 90 and 3,000 in an aqueous drilling fluid containing finely divided solid material such as clay suspended therein, and 2–15% by weight of salt, 1–15 pounds of starch and not more than about 1 pound of alkali metal hydroxide per barrel, to control the water loss properties of the system.

U.S. Pat. No. 3,525,688 discloses a water base drilling fluid containing sufficient clay to form a filter cake on the wall of the borehole and from 1 to 15 pounds of a polyethylene glycol having a molecular weight range of from 9,000 to 200,000 to reduce the water loss of the drilling fluid without increasing the viscosity of the drilling fluid to the extent it cannot be circulated.

The present invention can be briefly described as a method of and composition for use in drilling wells comprising an aqueous drilling fluid consisting essentially of an aqueous solution containing clay solids dispersed therein by a clay dispersing agent, sufficient alkali metal hydroxide or oxide to provide a pH of at least 9.0 to the drilling fluid, a contaminating amount of salt in said aqueous drilling fluid whereby the drilling fluid rheological properties are substantially impaired and a minor amount of polyethylene glycol having a molecular weight range of about 300–500, whereby the rheological properties are substantially restored.

The method comprises incorporating the specific glycol additive as hereinafter defined, into the salt contaminated drilling fluid in an amount ranging from 0.5 to 10.0 pounds thereof per barrel of drilling fluid, whereby the drilling fluid properties of viscosity and gel strength are substantially restored.

It is surprising that the particular glycol additives of this invention are effective in restoring the impaired rheological properties of a salt contaminated low pH fresh water drilling fluid since other glycols such as the higher molecular weight polyethylene glycols are not as effective. The glycols useful in the present invention are the polyethylene glycols of from 200 to 500 molecular weight, and particularly those in the weight range of 300–400 molecular weight.

In carrying out the method of the present invention it is necessary that the polyethylene glycol of prescribed molecular weight be added to the salt contaminated low pH aqueous drilling fluid in order to attain the desired restoration of rheological properties. Addition of the polyethylene glycol to a low pH fresh water drilling fluid prior to the drilling fluid coming into contact with contaminating amounts of salt will result in little or no improvement in restoring the rheological properties to the drilling fluid.

The drilling fluid used in the method of the invention is a low pH fresh water drilling fluid containing clay solids dispersed therein by a clay dispersing agent, such as lignosulfonate dispersant and sufficient caustic to maintain the pH thereof above about 9.0.

Following is a description by way of example of the method of carrying out the present invention.

A fresh water drilling fluid containing clay solids dispersed therein by a ferrochrome lignosulfonate dispersant sold under the trade name "Q-Broxin", which is present in an amount of 6 pounds per barrel, and sufficient caustic to provide a pH of at least 9.0 to the drilling fluid was used as the base mud. This mud was contaminated with salt and then treated with various molecular weight glycols. The drilling fluid containing the salt and glycol was aged for four hours at 150° F. before determining the rheological properties. Determination of the base mud properties was made after a similar aging treatment. The rheological properties are set forth in the following table:

TABLE A

| Example | Amount of NaCl lbs/bbl | Amount of Polyethylene Glycol, lbs/bbl (Molecular Weight) | PV cp. | YP lbs/ 100 ft.$^2$ | AV cp. |
|---|---|---|---|---|---|
| Base Mud A | 0 | 0 | 34 | 9 | 39.5 |
| " | 20 | 0 | 37 | 128 | 101 |
| 1 | 20 | 10-Glycol (200) | 39 | 32 | 55 |
| 2 | 20 | 10-Glycol (300) | 41 | 24 | 53 |
| 3 | 20 | 10-Glycol (400) | 40 | 17 | 48.5 |
| 4 | 20 | 10-Glycol (600) | 61 | 36 | 79 |
| 5 | 20 | 10-Glycol (1,000) | 55 | 60 | 85 |

From the data in the above Table A it is evident that the polyethylene glycol (600) and polyethylene glycol (1,000) are not as effective in restoring the mud properties as the lower molecular weight glycols 200, 300 and 400, since the Yield Point and Apparent Viscosity values obtained therewith are not as low as the corresponding values obtained using the lower molecular weight glycols, (i.e. 200–400).

The following Table B illustrates that the order of addition of the glycol is important.

TABLE B

| Example | Amount of NaCl lbs/bbl | Amount of Poly-Ethylene Glycol, lbs/bbl (Molecular Weight) | PV cp. | YP lbs/100 ft² | AV cp. |
|---|---|---|---|---|---|
| Base Mud | — | — | 24 | 0 | 24 |
| 6* | 7.5 | 4 - (400) | 34.5 | 7.5 | 38.3 |
| 7* | 10 | 4 - (400) | 32.5 | 8.5 | 36.8 |
| 8* | 15 | 4 - (400) | 24 | 26 | 37 |
| 6A** | 7.5 | 4 - (400) | 27 | 10 | 37 |
| 7A** | 10 | 4 - (400) | 36.5 | 18.5 | 45 |
| 8A** | 15 | 4 - (400) | 25.5 | 41 | 46 |

*Salt first, then glycol.
**Glycol first, then salt.

In the foregoing Table B the substantial differences between the relatively low Yield Point Values and Apparent Viscosity Values obtained when the polyethylene glycol 400 is added subsequent to the salt (Examples 6–8) in accordance with the method of the invention and the higher values shown for Examples 6A–8A wherein the glycol was added before the salt, illustrate the criticality of the order of addition of the polyethylene glycol 400 to the drilling mud, at varying concentrations of salt.

Obviously, many modifications and variations of the invention as hereinbefore set forth may be made without departing from the spirit and scope thereof and, therefore, only such limitations should be imposed as are indicated in the appended claims.

We claim:

1. In a method of drilling wells wherein a drilling fluid is passed through the well into contact with the earth formation during the drilling operation, the improvement which comprises contacting said earth formation with a low pH fresh water drilling fluid consisting essentially of clay solids dispersed therein by a clay-dispersing agent and sufficient alkali metal hydroxide to provide a pH of from about 9 to about 9.5 thereto, and wherein when said drilling fluid comes in contact with a sufficient amount of salt in said formation whereby its rheological properties are substantially impaired there is added to said drilling fluid a polyethylene glycol having an average molecular weight of from about 200 to about 500 in an amount of from about 0.5 to about 10 pounds per barrel of drilling fluid to restore the rheological properties of said drilling fluid.

2. The method of claim 1 wherein said polyethylene glycol has an average molecular weight range of from about 300 to 400.

* * * * *